(12) United States Patent
Hall

(10) Patent No.: US 11,394,777 B2
(45) Date of Patent: Jul. 19, 2022

(54) RELIABLE DATA STORAGE FOR DECENTRALIZED COMPUTER SYSTEMS

(71) Applicant: AT&T Intellectual Property I, L.P., Atlanta, GA (US)

(72) Inventor: Robert J. Hall, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/273,359

(22) Filed: Feb. 12, 2019

(65) Prior Publication Data
US 2019/0173948 A1 Jun. 6, 2019

Related U.S. Application Data

(63) Continuation of application No. 15/450,904, filed on Mar. 6, 2017, now Pat. No. 10,212,229.

(51) Int. Cl.
| | | |
|---|---|---|
| *H04L 67/1097* | (2022.01) | |
| *H04L 12/46* | (2006.01) | |
| *H04L 43/08* | (2022.01) | |
| *H04L 43/0852* | (2022.01) | |
| *H04L 67/1095* | (2022.01) | |

(52) U.S. Cl.
CPC ...... *H04L 67/1097* (2013.01); *H04L 12/4633* (2013.01); *H04L 12/4641* (2013.01); *H04L 43/08* (2013.01); *H04L 43/0852* (2013.01); *H04L 67/1095* (2013.01)

(58) Field of Classification Search
CPC .................................................. H04L 67/1097
See application file for complete search history.

(56) References Cited

U.S. PATENT DOCUMENTS

| | | |
|---|---|---|
| 7,546,484 B2 | 6/2009 | Sen et al. |
| 7,685,179 B2 | 3/2010 | Maccormick |
| 7,873,732 B2 | 1/2011 | Chen et al. |

(Continued)

OTHER PUBLICATIONS

Balasubramanian et al.; "Load-aware Adaptive Failover for Middleware Systems with Passive Replication"; Technical Report; Vanderbilt University; 2008; 20 pages.

(Continued)

*Primary Examiner* — Nicholas P Celani
(74) *Attorney, Agent, or Firm* — Guntin & Gust, PLC; John G. Rauch

(57) ABSTRACT

A method includes receiving a data object for storage in a storage system. The storage system includes a number of datacenters (s) interconnected by a first network. Each of the datacenters is located in a geographic location that is different than any geographic locations of any other of the datacenters. The method includes creating secondary copies of the data object. A number of secondary copies is equal to at least s−1. The method includes, in accordance with a placement map of at least one of the datacenters, storing a primary copy of the data object in one of the datacenters. The method also includes, in each other of the datacenters, storing at least one of the secondary copies. The method also includes monitoring, via a plurality of data monitors, an accessibility of data stored in the storage system. The data includes the primary copy and the secondary copies of the data objects.

20 Claims, 6 Drawing Sheets

(56) References Cited

U.S. PATENT DOCUMENTS

| | | | |
|---|---|---|---|
| 8,099,499 B2 | 1/2012 | Oeda | |
| 8,489,939 B2 | 7/2013 | Hiltunen et al. | |
| 9,450,810 B2 | 9/2016 | Huang et al. | |
| 10,212,229 B2* | 2/2019 | Hall | H04L 67/1097 |
| 2005/0216813 A1* | 9/2005 | Cutts | G06F 11/1076 |
| | | | 714/752 |
| 2007/0220320 A1* | 9/2007 | Sen | G06F 11/1456 |
| | | | 714/13 |
| 2008/0285436 A1 | 11/2008 | Robinson | |
| 2009/0144338 A1 | 6/2009 | Feng et al. | |
| 2010/0131545 A1* | 5/2010 | Srivastava | G06F 16/27 |
| | | | 707/769 |
| 2012/0159558 A1 | 6/2012 | Whyte et al. | |
| 2013/0346786 A1 | 12/2013 | Thiel et al. | |
| 2015/0026517 A1* | 1/2015 | Ben Romdhane | G06F 11/1458 |
| | | | 714/15 |
| 2016/0048408 A1 | 2/2016 | Madhu et al. | |
| 2016/0080211 A1* | 3/2016 | Anand | G06F 16/285 |
| | | | 709/224 |
| 2016/0283259 A1 | 9/2016 | Mehta | |
| 2016/0349993 A1* | 12/2016 | Udupi | G06F 3/061 |
| 2017/0054654 A1 | 2/2017 | Garg et al. | |
| 2017/0193070 A1 | 7/2017 | Miller et al. | |

OTHER PUBLICATIONS

Chien et al.; "Zero-Carbon Cloud: A Volatile Resource for High-Performance Computing"; IEEE Int'l Conf. Computer Information Technology; Ubiquitous Computing and Communications; Dependable, Autonomic and Secure Computing; 2015; 4 pages.

* cited by examiner

RELIABLE DATA STORAGE FOR DECENTRALIZED COMPUTER SYSTEMS

CROSS-REFERENCE TO RELATED APPLICATION

This Application claims priority to, and is a continuation of U.S. patent application Ser. No. 15/450,904, filed Mar. 6, 2017, now U.S. Pat. No. 10,212,229 issued on Feb. 19, 2019. U.S. patent application Ser. No. 15/450,904 is incorporated herein by reference in its entirety.

TECHNICAL FIELD

This disclosure relates generally to reliable data storage for decentralized systems and, more specifically, to reliable data storage using lightweight datacenters.

BACKGROUND

Enterprise cloud computing may deploy in a few large datacenters. This approach may offer economies of scale in centralizing operations, building supply lines, and focusing resources to harden physical plants against failures, disasters, attacks, or other vulnerabilities. However, centralizing operations has performance costs, particularly for the many users remotely located from the few datacenters, which can introduce undesirable network latency.

One proposed solution to the performance and latency problems is the use of smaller, more geographically dispersed datacenters. However, it may be cost prohibitive to invest the same resources to protect more datacenters the same way large datacenters are protected. Thus, there is a need for providing more reliable data management when data is being stored in datacenters that individually have lower reliability than traditional, larger datacenters.

SUMMARY

In an aspect, this disclosure is directed to a method. The method may include identifying a datacenter group having a number of datacenters (s). Each datacenter of the s datacenters may include a plurality of data monitors. A number of the plurality of data monitors in each datacenter may be equal to at least s+1. For each datacenter of the datacenter group, the method may include creating a placement map. The method may also include receiving a data object to be stored in the datacenter group. The method may include creating secondary copies of the data object. A number of the secondary copies may be equal to at least s−1. The method may also include, in accordance with the placement maps, storing a primary copy of the data object in one of the datacenters. The method may also include, in each other of the datacenters, storing at least one of the secondary copies. Each datacenter may be located at a geographic location that is different than a respective geographic location of the other datacenters of the datacenter group.

According to another aspect, this disclosure is directed to a system. The system may include a first network and a total number of datacenters (s) interconnected via the first network. The system may include a data controller communicatively coupled to the first network. The data controller may include an input/output for communicating via a second network, a processor communicatively coupled to the input/output, and memory storing instructions that cause the processor to effectuate operations. The operations may include, for each datacenter of the s datacenters, creating a placement map. The operations may also include receiving a data object via the second network. The operations may include creating secondary copies of the data object. A number of secondary copies may be equal to at least s−1. The operations may also include, in accordance with the placement maps, storing a primary copy of the data object in one of the datacenters. The operations may also include, in each of the other datacenters, storing at least one of the secondary copies. Each of the s datacenters may located at geographically distinct locations from one another.

In accordance with yet another aspect, this disclosure is directed to a method. The method may include receiving a data object for storage in a storage system. The storage system may include a number of datacenters (s) interconnected by a first network. Each of the datacenters may be located in a geographic location that is different than any geographic locations of any other of the datacenters. The method may include creating secondary copies of the data object. A number of secondary copies may be equal to at least s−1. The method may include, in accordance with a placement map of at least one of the datacenters, storing a primary copy of the data object in one of the datacenters. The method may also include, in each other of the datacenters, storing at least one of the secondary copies. The method may also include monitoring, via a plurality of data monitors, an accessibility of data stored in the storage system. The data may include the primary copy and the secondary copies of the data objects.

BRIEF DESCRIPTION OF THE DRAWINGS

Aspects of the herein described systems and methods for network modeling and building, updating, and querying a graph database are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

To increase data platform reliability, a platform provider may desire to minimize loss events that impact service (e.g., access to the data). For example, a loss event may include unavailability events, such as down time of a service or inaccessibility of a service's data due to a host, power, switch, or datacenter failure. A loss event may also include permanent loss of data, such as when all copies of a data object are lost, such as due to drive failures.

Platform reliability may be related to availability, which may be measured by the percentage of time that data is available to a service. For example, availability may be measured as "nines," which refers to the number of leading 9-digits in a decimal representation of the percentage.

Optionally the "nines" measurement may refer to the decimal representation after rounding to a defined number of places. For example, "5 nines" may refer to 99.999% availability, while "three nines" may refer to 99.9% availability. (As a note, this availability metric may be based on an assumption that all data is "recoverable" in a finite time one way or another, even if that recovery is paying a penalty without actually recovering that permanently lost data.)

Just as a whole platform may have reliability and availability metrics, similar metrics may be measured for subsystems or single devices within the platform. The reliability and availability metrics of a single device may impact the reliability and availability of a system containing that device.

For example, if a storage system is physically contained within a single datacenter, then the reliability of that storage system can be no better than the reliability of the datacenter. Thus, it may be worth investing heavily in physical plant and operations support to make that single datacenter as robust as possible in order to increase reliability. However, applying such heavy investment across a large number of datacenters may be cost prohibitive. One solution to increasing data availability is to implement redundant storage systems (e.g., replicated redundant storage systems and coded redundant storage systems) across a distributed computer system of less expensive (and less reliable) datacenters.

Figure 1:
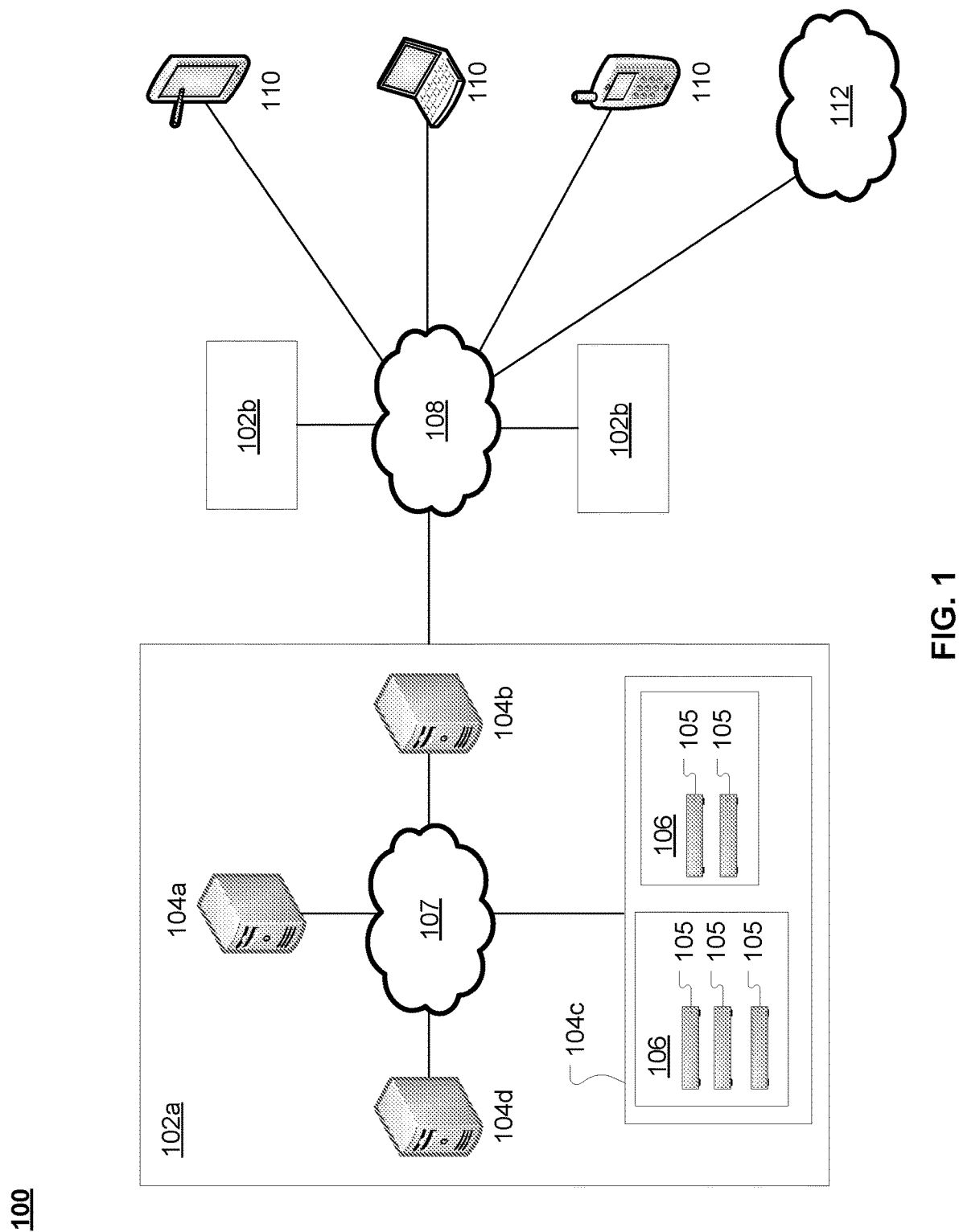
FIG. 1 illustrates an exemplary network including data storage systems.

For example, FIG. 1 illustrates a communication system 100 in which one or more storage systems 102a or 102b (generally 102) may be created, used, or managed. Storage system 102 may include any number or type of hardware (together or alone with software) for storing data. For example, storage system 102 may comprise one or more datacenters 104. For example, FIG. 1 shows storages system 102a including four datacenters 104a-d. Other storage systems 102, such as storage system 102b, may have the same or different number of data centers 104. In turn, datacenter 104 may comprise memory to store data. For example, datacenter 104 may include one or more servers 105, as shown for datacenter 104c. These servers 105 may be grouped together onto one or more racks 106. The type and features of datacenters 104 may vary from one another. For example, datacenter 104a may have a different type of memory or a different amount of memory than datacenter 104b. Similarly, each storage system 102 may vary from one another.

Datacenters 104 within a particular storage system 102 may be interconnected via a first network connection 107. First network connection 107 may have a first set of parameters. For example, first network 107 may have minimum bandwidth or maximum latency requirements. First network 107 may be wired or wireless. First network 107 may comprise cryptographically secured mechanisms, such as virtual private network (VPN) tunnels.

Communication system 100 may include a second network 108 for connecting storage system 102a (and datacenters 104) with one or more other storage systems 102, end devices 110, or other networks 112. In an aspect, second network 108 may comprise a provider network, a platform network, or the like. Second network 108 may have a second set of parameters, and the second set of parameters may be different than the first set of parameters.

Storage system 102 may be a redundant storage system. For example, the hardware and software of storage system 102 (e.g., data centers 104) may be fallible. By storing data redundantly—such as by storing more than one bit per bit of data, the extra bits may be used to reconstruct data that may otherwise be lost due to failures of one or more data centers 104, such as drive failures or other outages. As an example, storage system 102 may be a replicated redundant system that stores one or more additional full copies of each data object.

Additionally or alternatively, storage system 102 may be a coded redundant storage system—such as one that stores computed code bits that may be used to reconstruct lost data, such as by using algebraic computations. One advantage of a coded redundant system is that they may be able to achieve higher reliability for a given amount of extra storage space per object than replicated systems. On the other hand, replicated systems typically perform better (e.g., in operations per second, throughput, and latency). These one or more additional copies or coded bits may be stored according to a placement strategy.

A placement strategy may be a policy-controlled method for deciding where the stored data (e.g., including primary data and redundancy bits) are placed within storage system 102. For example, a placement strategy may incorporate a spread placement strategy or a partitioned placement strategy. A spread placement strategy may randomly choose a subset of the drives (e.g., a subset of datacenters 104, servers 105, or racks 106) and store each copy of an object on a distinct drive in the subset. In a spread placement strategy, there may be no alignment between replicas of different objects. A partitioned placement strategy may align the replica sets of objects along boundaries of partitions, which may be groups of drives. In a partitioned placement strategy, no object may have replicas in more than one partition. Other placement strategies include one-per-rack, one-per-host, rack-aware, copyset, and partitioned-max-distributed.

Figure 2:
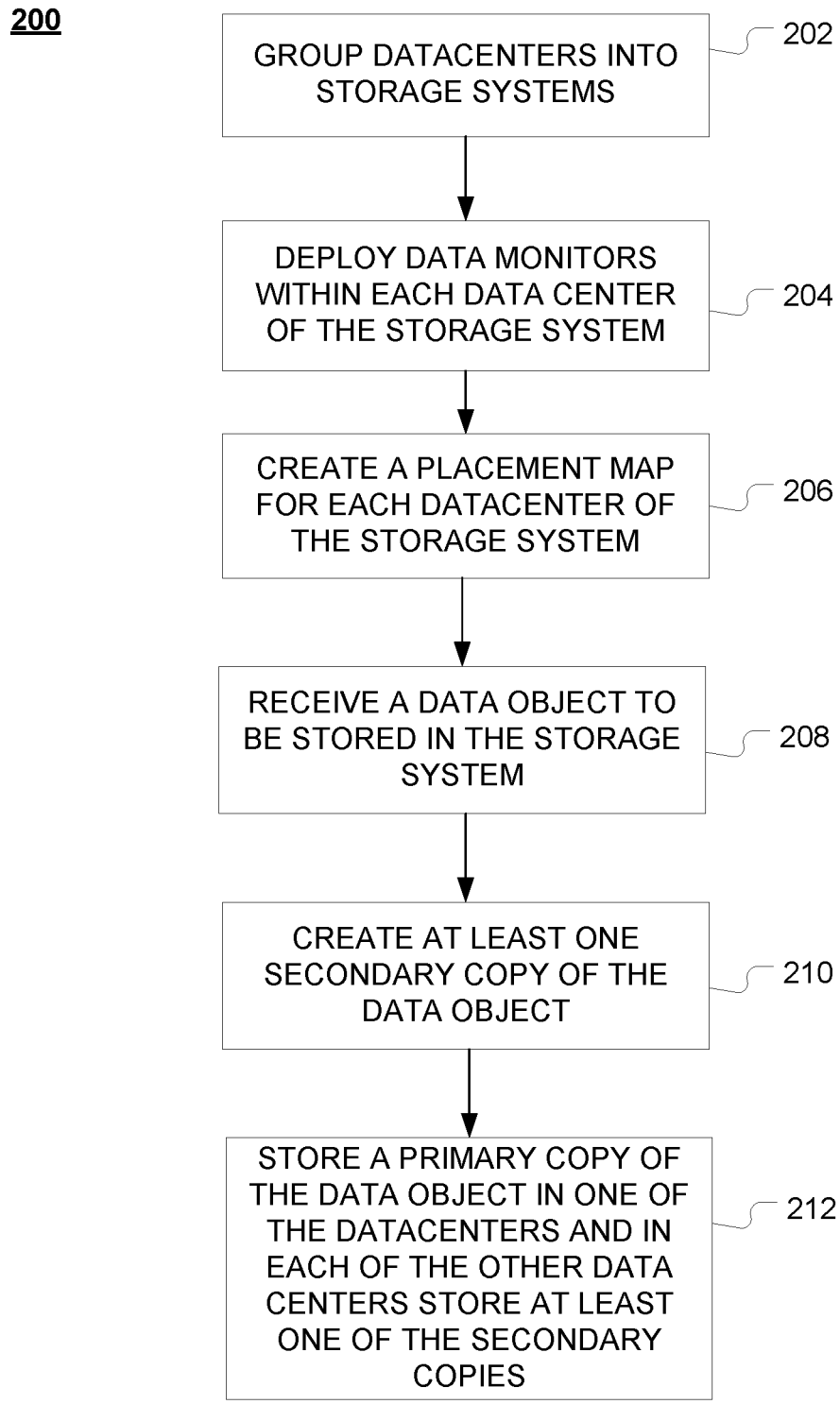
FIG. 2 is a flowchart of an exemplary method.

FIG. 2 includes a flowchart of an exemplary method 200 for achieving high assurance storage within a system of multiple datacenters 104. The reliability of method 200 may be controlled by a nonnegative integer parameter s. Parameter s may represent the number of extra replicas of each stored object. For example, method 200 having s equal zero may be less reliable than method 200 having s equal 1.

Method 200 may operate for a set of datacenters 104. The set of datacenters 104 may comprise k number of groups, and each group may comprise s number of datacenters 104. Each datacenter 104 may comprise d number of storage drives (e.g., racks 105).

At step 202, method 200 may include grouping datacenters 104 into k groups. Optionally, the groups may be disjoint sets. For example, FIG. 1 illustrates three groups (e.g., storage systems 102a and 102b).

Figure 3:
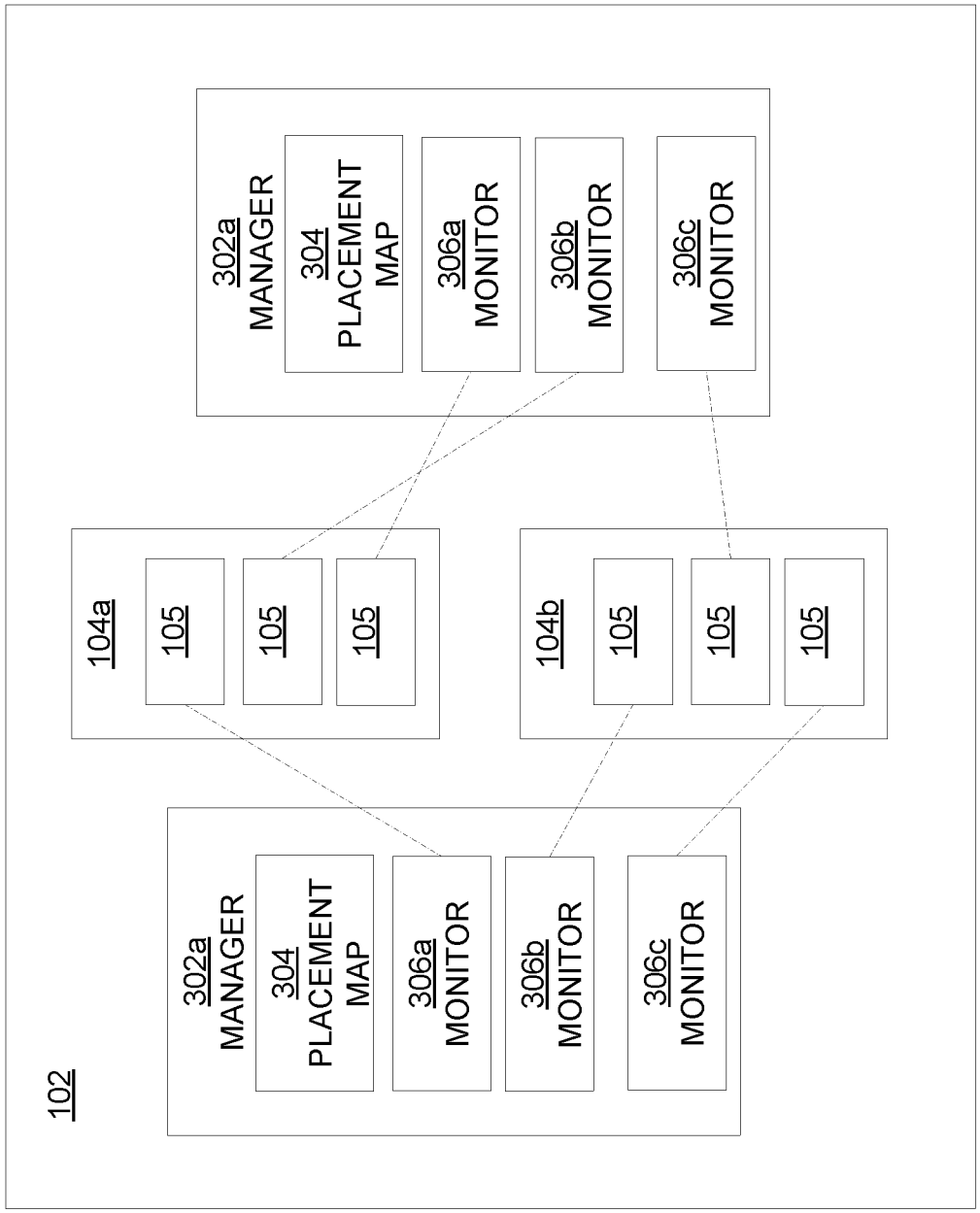
FIG. 3 illustrates an exemplary data storage system.

As shown in FIG. 3, within each group (e.g., storage system 102) a number of managers 302 may be deployed. Managers 302 may have functionality to read and write data in storage system 102, retrieve data from storage system 102, respond to queries for data stored in storage system 102 (including queries originating outside storage system 102, Manager 302 may have functionality to implement a replicated or coded redundancy, and it may allow placement strategy to be configured dynamically. Manager 302 may include a placement map 304 for storing and retrieving data. Manager 302 may also include functionality for monitoring data stored (or locations within) data storage system 102. For example, managers 302 shown in FIG. 3 each have three data monitors 306 for monitoring storage system 102. For example, manager 302 may be an instance of Ceph or another application for implementing distributed storage, such as Swift.

In an aspect, the number of managers 302 may equal at least s—that is, the number of datacenters 104 in storage system 102. For example, in the exemplary storage system 102 of FIG. 3, there are two datacenters—104a and 104b—and two managers 302a and 302b. Managers 302 may be deployed such that each datacenter 104 includes at least one manager 302. Further, within each manager 302, the number of data monitors 306 may equal at least s+1. For example, FIG. 3 shows that each manager 302 includes three data monitors 306.

Returning to FIG. 2, at step 204, a plurality of data monitors 306 may be deployed. Each manager 302 may include at least one data monitor 306. Each data monitor 306 may be responsible for monitoring approximately 1/(s+1) of drives 105 of each datacenter 104.

Returning to FIG. 2, at step 206, method 200 may include creating a placement map 304 for each datacenter 102. For example, as shown in FIG. 3 each manager 302 may comprise a placement map 304. Each placement map 304 may dictate placement of data within datacenter 104 in which that manager 302 is deployed. Additionally or alternatively, placement map 304 may dictate placement of data within other datacenters 104 of storage system 102. As discussed above, placement map 304 may dictate how primary and secondary copies of data are stored in datacenters 104. For example, placement map 304 may dictate that all primary object copies are placed within datacenter 104 with which placement map 304 is associated. Placement map 304 may dictate that secondary object copies are placed one per member across the other datacenters 104 of the storage system 102. For example, placement map 304 of manager 302a may dictate that primary object data be stored in datacenter 104a and secondary object data be stored in datacenter 104b, and placement map 304 of manager 302b may dictate that primary object data be stored in datacenter 104b and secondary object data be stored in datacenter 104a.

Placement map 304 may have other policies or functionalities. For example, placement map 304 may dictate that the overall placement strategy is partitioned. For example, object replica sets may be aligned within member sets of drives 105, such as s member sets of drives 105. In Ceph implementations of managers 302, placement map 304 may be a crush map.

Figure 4:
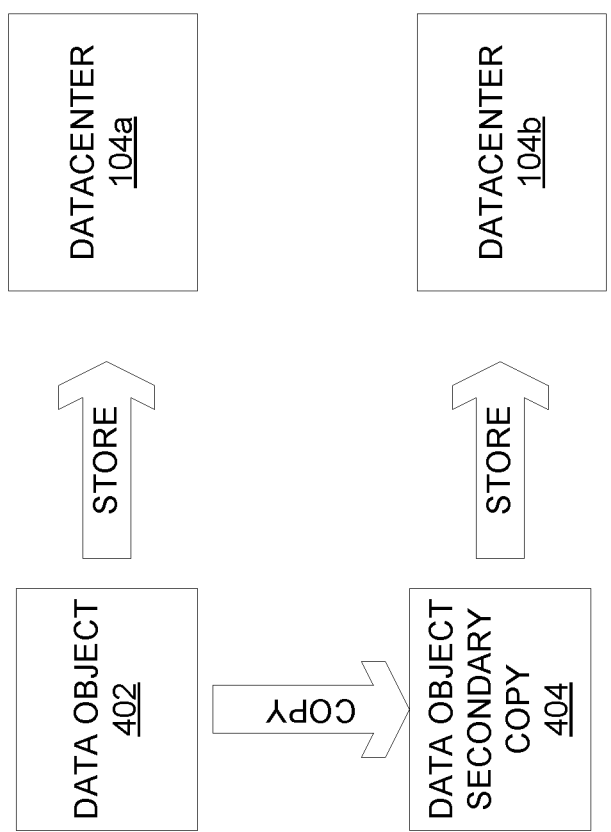
FIG. 4 illustrates a data flow for storing data within the data storage system.

Method 200 of FIG. 2 continues by storing data in storage system 102. This data flow is illustrated in FIG. 4. At step 208, method 200 may include receiving a data object 402 to be stored in storage system 102. At step 210, method 200 may include creating at least one secondary copy (e.g., data object secondary copy 404), as illustrated by the COPY arrow in FIG. 4. The number of secondary copies 404 may be at least one less than the number of datacenters 104. For example, for the storage system 102 of FIG. 3, the number of secondary copies 404 may be at least one since the number of data centers 104 is equal to 2. As another example, if an exemplary storage system 102 included 14 datacenters 104, then the number of secondary copies 404 may be 13.

At step 212, method may include storing a primary copy of data object 402 (e.g. data object 402)—as illustrated by the STORE arrow originating from data object 402—in one of datacenters 104 and, in each of the other datacenters 104 of storage system 102, storing at least one of the secondary copies 404—as illustrated by the STORE arrow originating from data object secondary copy 404. This storage may be done in accordance with placement map 304.

Returning to FIG. 3, managers 302 may include different or additional functionality for storing data in or retrieving data from datacenters 104. The functionality of managers 302 may vary among managers 302. For example, managers 302 may manage data (e.g., data objects 402 and secondary copies 404). This may include conducting read/writes to store or retrieve data objects 402 or secondary copies 404. Each manager 302 may use (s+1)-replication to replicate data objects 402. As another example, each manager 302 may control a certain percentage of drives 105.

For example, each manager 302 may control approximately 1/(s+1) of drives 105 in storage system 102. As an example, in storage system 102 of FIG. 3, where s equals two, each manager 302 may control one-third of drives 105. Optionally, each manager 302 may control approximately 1/(s+1) of drives 105 of each datacenter 104. For example, manager 302 may control one-third of drives 105 of datacenter 104a and one-third of drives 105 of datacenter 104b. This control may be limited, for example, to read/write actions, to dictating how data objects 402 and secondary objects 404 are stored, or the like. Additionally or alternatively, this control may include deciding which datacenter 104 hosts data object 402, and which data center 104 hosts secondary objects 404. Additionally or alternatively, this control may include dictating where the application or software using data object 404 is stored. More generally, this control may control all aspects of the data stored in those drives 105.

Each manager 302 may include one or more data monitors 306 that may monitor the functionality of drives 105 or datacenters 104. Additionally or alternatively, data monitors 304 may communicate with one another.

For example, each manager 302 may include at least (s+1) data monitors 306. For example, as the exemplary storage system 102 of FIG. 3 comprises two datacenters 104, each manager 302 may comprise three data monitors 306a, 306b, and 306c. Optionally, each data monitor 306 of a given manager 302 may be running in each datacenter 104. For example, at least one of data monitors 306a, 306b, and 306c may be running in datacenter 104a. Additionally, at least one other of data monitors 306a, 306b, and 306c may be running in datacenter 104b. This is illustrated in FIG. 3 by the dashed lines illustrating which data monitor 306 is running in which datacenter 104. For example, in this exemplary embodiment, data monitor 306a of manager 302a and data monitors 306a and 306b of manager 302a may be running on datacenter 104a, and data monitors 306b and 306c of manager 302a and data monitor 306c of manager 302b may be running on datacenter 104b.

Each data monitor 306 may manage drives 105 or datacenters 104. This management may include handling change or loss events that affect the drives 105 or datacenters 104 within the purview of data monitor 306. For example, data monitor 306 may detect a change or loss event. Data monitor 306 may take one or more actions in response to detecting change or loss event.

For example, data monitor 306 may notify other data monitors 306 of the change or loss event. Data monitor 306 may attempt to repair or undo the change or loss event. Further, data monitor 306 may identify data objects 402 or secondary objects 404 that are inaccessible as a result of the event. Data monitor 306 may also then identify the locations of other copies of that inaccessible data, optionally by communicating with other data monitors 306. Data monitor 306 may redirect queries for inaccessible data to other locations where the data is stored. Data monitor 306 may retrieve, through first network 107, another copy of data object 404 from another source in response to an outside query for that data.

Figure 5:
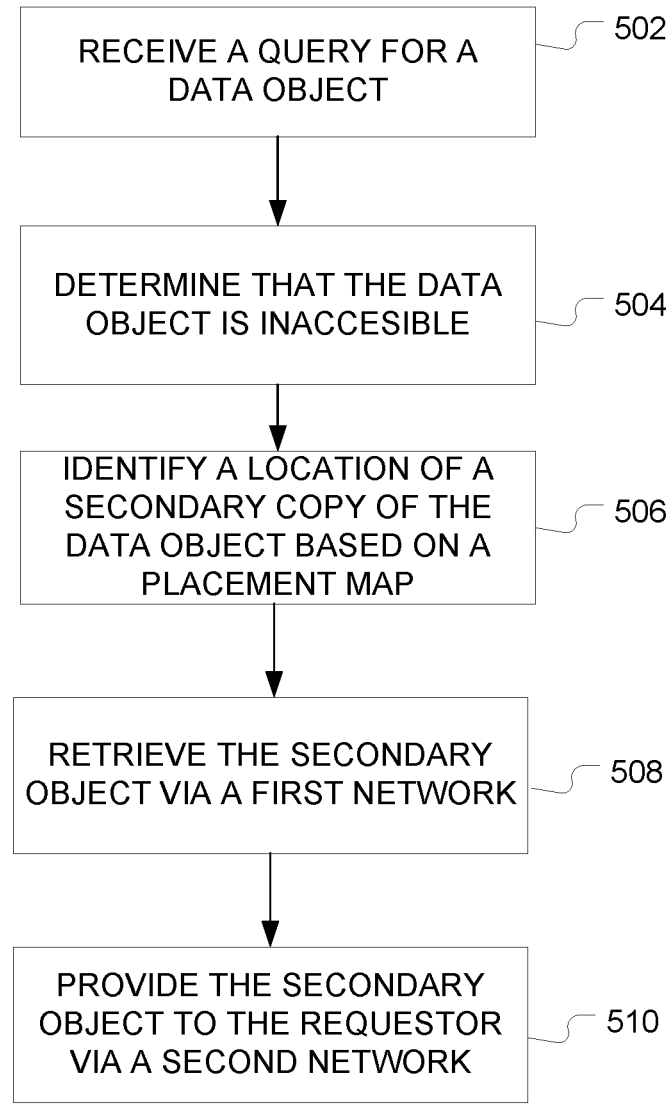
FIG. 5 illustrates an exemplary method for responding to a query.

For example, FIG. 5 illustrates a method 500 for responding to a query for data object 402 (FIG. 4). At step 502, storage system 102 may receive a query for data object 402.

This query may be received at datacenter 104 in which data object 402 is stored. For example, a given datacenter 104 may be responsible for providing all data to a specific application or subset of an application. Thus, data requests from that application or other requestor may be directed to datacenter 104. The query for data object 402 may be received through a given network connection, such as second network 108.

At step 504, method 500 may include determining that the primary copy of data object 402 (e.g., data object 402) is inaccessible. This inaccessibility may be caused by a software or mechanical failure of drive 105 in which data object 402 is stored. To respond to the query, then, secondary copy data object 404 may be used.

At step 506, method 500 may include identifying a location of secondary copy data object 404 based on placement map 304. The location of secondary copy data object 404 may be in the same datacenter 104 (e.g., the same geographic location) in which the primary copy (e.g., data object 402) is located. Further, the location of secondary copy data object 404 may be in a different datacenter 104 than primary data object 402.

At step 508, method 500 may include retrieving secondary copy data object 404 through first network 106. By using first network 106 (e.g., VPN tunnel), to access secondary copy data object 404, rather than a higher latency network connection (e.g., second network 108), latencies can be reduced.

At step 510, method 500 may include communicating data based on secondary copy data object 404 in response to the query via second network 108.

It will be understood that the terms and expressions used herein have the ordinary meaning as is accorded to such terms and expressions by persons of ordinary skill in the field of the present disclosure as set forth above, except where specific meanings have otherwise been set forth herein.

Figure 6:
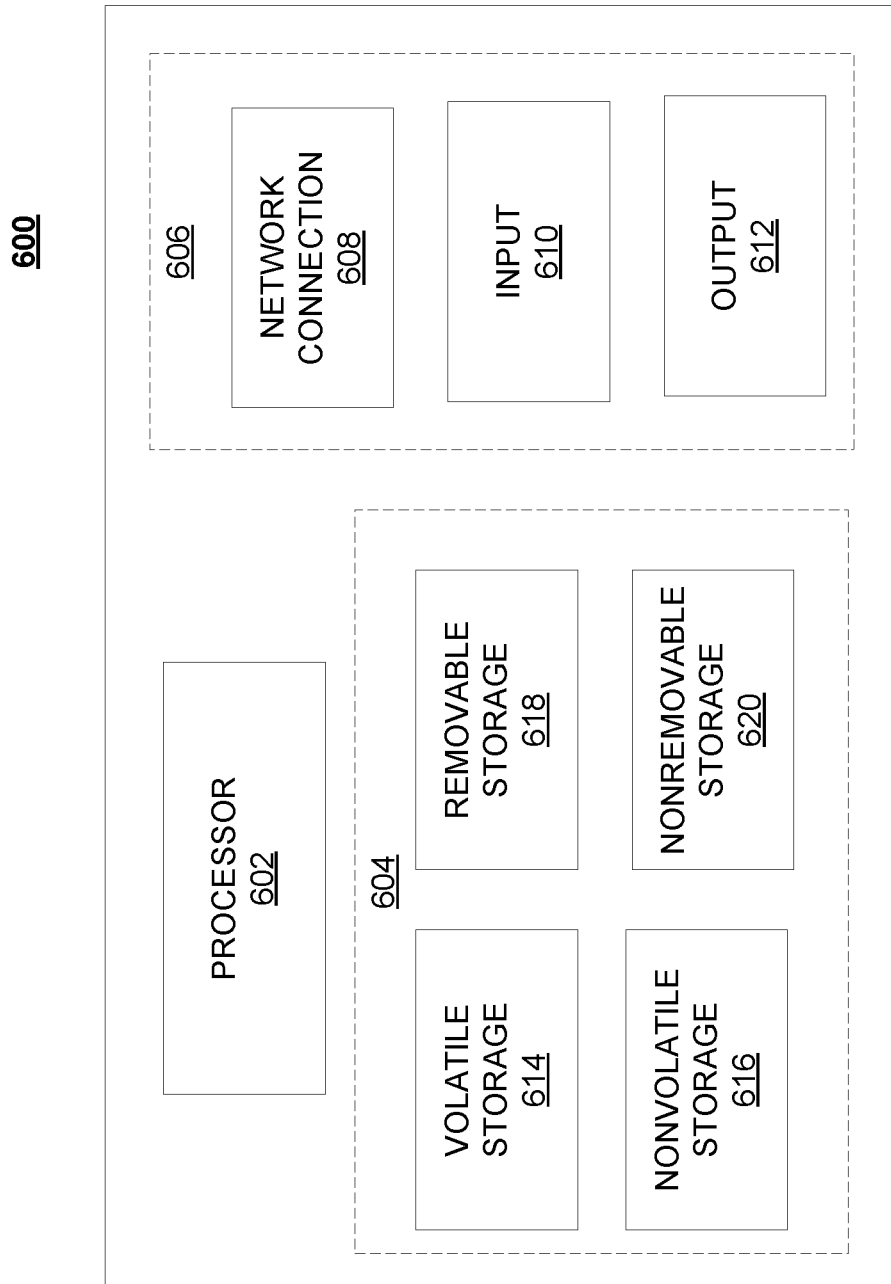
FIG. 6 illustrates an exemplary network device.

FIG. 6 is a block diagram of a network device 600 that may be connected to or comprise a component system 100. For example, one or more of datacenters 104 or servers 105 may comprise network device 600. Network device 600 may comprise hardware or a combination of hardware and software.

The functionality to facilitate telecommunications via a telecommunications network may reside in one or a combination of network devices 600. Network device 600 depicted in FIG. 6 may represent or perform functionality of an appropriate network device 600, or combination of network devices 600, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 600 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 600 may comprise a processor 602 and a memory 604 coupled to processor 602. Memory 604 may contain executable instructions that, when executed by processor 602, cause processor 602 to effectuate operations associated with mapping wireless signal strength. As evident from the description herein, network device 600 is not to be construed as software per se.

In addition to processor 602 and memory 604, network device 600 may include an input/output system 606. Processor 602, memory 604, and input/output system 606 may be coupled together (coupling not shown in FIG. 3) to allow communications therebetween. Each portion of network device 600 may comprise circuitry for performing functions associated with each respective portion. Thus, each portion may comprise hardware, or a combination of hardware and software. Accordingly, each portion of network device 600 is not to be construed as software per se. Input/output system 606 may be capable of receiving or providing information from or to a communications device or other network entities configured for telecommunications. For example input/output system 606 may include a wireless communications (e.g., 3G/4G/5G/GPS) card. Input/output system 606 may be capable of receiving or sending video information, audio information, control information, image information, data, or any combination thereof. Input/output system 606 may be capable of transferring information with network device 600. In various configurations, input/output system 606 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 606 may comprise a Wi-Fi finder, a two-way GPS chipset or equivalent, or the like, or a combination thereof.

Input/output system 606 of network device 600 may also contain one or more network connections 608 that allows network device 600 to facilitate communications between datacenters 102, devices 110, and networks, such as networks 107 or 108. Network connections 608 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 606 also may include an input device 610 for receiving user inputs, such as keyboard, mouse, pen, voice input device, or touch input device. Input/output system 606 may also include an output device 612, such as a display, speakers, vibration outputs, or a printer. For example, input/output system 606 may include an IEEE 802.11-compliant transceiver. Optionally, input/output system 606 of device 600 may also include a transceiver for communicating with a cellular network, such as a core network, such as network 107 or 108.

Processor 602 may be capable of performing functions associated with telecommunications, such as functions for processing broadcast messages, as described herein. For example, processor 602 may be capable of, in conjunction with any other portion of network device 600, determining a type of broadcast message and acting according to the broadcast message type or content, as described herein.

Memory 604 of network device 600 may comprise a storage medium having a concrete, tangible, physical structure. As is known, a signal does not have a concrete, tangible, physical structure. Memory 604, as well as any computer-readable storage medium described herein, is not to be construed as a signal. Memory 604, as well as any computer-readable storage medium described herein, is not to be construed as a transient signal. Memory 604, as well as any computer-readable storage medium described herein, is not to be construed as a propagating signal. Memory 604, as well as any computer-readable storage medium described herein, is to be construed as an article of manufacture.

Memory 604 may store any information utilized in conjunction with telecommunications. Depending upon the exact configuration or type of processor, memory 604 may include a volatile storage 614 (such as some types of RAM), a nonvolatile storage 316 (such as ROM, flash memory), or a combination thereof. Memory 604 may include additional storage (e.g., a removable storage 618 or a nonremovable storage 620) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 600. Memory 604 may comprise executable instructions that, when executed by processor 602, cause processor 602 to effectuate operations to store, retrieve, or query data from data storage system 102.

The sequences and methods shown and described herein can be carried out in a different order than those described. The particular sequences, functions, and operations depicted in the drawings are merely illustrative of one or more implementations of the present disclosure, and other implementations will be apparent to those of ordinary skill in the art. The drawings are intended to illustrate various implementations of the present disclosure that can be understood and appropriately carried out by those of ordinary skill in the art. Any arrangement, which is calculated to achieve the same purpose, may be substituted for the specific examples provided.

Although the present disclosure has been described in connection with some embodiments, it is not intended to be limited to the specific form set forth herein. Rather, the scope of the present disclosure is limited only by the accompanying claims. Additionally, although a feature may appear to be described in connection with particular implementations, one of ordinary skill in the art would recognize that various features of the described examples may be combined in accordance with the present disclosure. In the claims, the term "comprising" does not exclude the presence of other elements or steps.

Furthermore, although individually listed, a plurality of means, elements, or method steps may be implemented by or contained within a single system, such as a single processor. Additionally, although individual features may be included in different claims, these may possibly be advantageously combined, and the inclusion in different claims does not imply that a combination of features is not feasible or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked, and, in particular, the order of individual steps in a method claim does not imply that the steps must be performed in this order. Rather, the steps may be performed in any suitable order. In addition, singular references do not exclude a plurality. Thus references to "a," "an," "first," "second," or the like do not preclude a plurality.

While exemplary implementations of the systems and methods for data storage have been described in connection with various computing devices or processors, the underlying concepts can be applied to any computing device, processor, or system capable of facilitating initiation of a call to an emergency call center as described herein. The methods and apparatuses for data storage, or certain aspects or portions thereof, can take the form of program code (e.g., computer readable instructions) embodied in tangible storage media having a physical structure, such as floppy diskettes, CD-ROMs, hard drives, or any other machine-readable storage medium having a physical tangible structure (computer-readable storage medium), wherein, when the program code is loaded into and executed by a machine, such as a computer, the machine becomes an apparatus for data storage. A computer-readable storage medium, as described herein is an article of manufacture, and thus, not to be construed as a transitory signal or a propagating signal. In the case of program code execution on programmable computers, the computing device may include a processor, a storage medium readable by the processor (such as volatile or non-volatile memory), at least one input device, and at least one output device. The program(s) can be implemented in assembly or machine language, if desired. The language can be a compiled or interpreted language, and combined with hardware implementations.

The methods and apparatuses for data storage may be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, or the like, the machine becomes an apparatus for facilitating data storage. When implemented on a general-purpose processor, the program code combines with the processor to provide a unique apparatus that operates to invoke the functionality for data storage.

While the disclosed systems and methods for data storage have been described in connection with the various examples of the various figures, it is to be understood that other similar implementations can be used or modifications and additions can be made to the described examples for data storage. For example, one skilled in the art will recognize that utilizing the data storage as described in the present application may apply to any environment, whether wired or wireless, and may be applied to any number of devices connected via a communications network and interacting across the network. Therefore, the disclosed systems and methods for data storage should not be limited to any single implementation, but rather should be construed in breadth and scope in accordance with the appended claims.

What is claimed:

1. A method comprising:
   identifying a datacenter group having a plurality of datacenters, the plurality of datacenters communicating data over a first network, wherein each datacenter of the plurality of datacenters comprises drives, a data manager, and a plurality of data monitors, wherein each data monitor monitors functionality of its respective data, wherein each respective data monitor is associated with a respective datacenter of the plurality of datacenters, the first network characterized by a minimum bandwidth requirement, a maximum latency requirement, or both, selected to reduce data communication latency among respective datacenters of the plurality of datacenters communicating on the first network;
dynamically configuring, by each data manager, a redundant placement strategy for storing data within each respective datacenter, the redundant placement strategy defining one of a spread placement strategy and a partitioned placement strategy for drives of each respective datacenter, wherein the spread placement strategy comprises randomly choosing a subset of drives of each respective datacenter and storing each replica copy of each data object on a distinct drive of the subset of drives, with no alignment between replica copies according to the spread placement strategy, and wherein the partitioned placement strategy comprises storing data objects with replica copies aligned along boundaries of partitions of the drives of the subset of drives, with no data object having a replica copy in more than one partition;
in accordance with the redundant placement strategy for each respective datacenter, storing a data object in one of the datacenters according to a replicated redundant system and, in at least one of the other datacenters, storing computed code bits of the data object according to a coded redundant system, wherein the storing a data object in one of the datacenters according to the replicated redundant system provides reduced latency relative to the stored computed code bits of the data object stored according to a coded redundant system;
monitoring, by each data monitor, functionality of its respective datacenter;
detecting, by a first data monitor of the plurality of data monitors, an event;
identifying, by the first data monitor in response to detecting the event, that the data object is inaccessible as a result of the event;
communicating, by the first data monitor, with a second data monitor of the plurality of data monitors;
identifying, by the first data monitor based on the communication with the second data monitor, a location of the computed code bits of the data object;
receiving, by the first data monitor, an outside query for the data object;
redirecting, by the first data monitor in response to the outside query for the data object, the outside query to the location of the computed code bits of the data object; and
reconstructing the data object from the computed code bits.

2. The method of claim 1, wherein the datacenters of the datacenter group are interconnected via first network connections on a first network, the first network characterized by a maximum latency requirement selected to reduce data communication latency among the plurality of datacenters.

3. The method of claim 2, wherein the first network connections comprise a virtual private network (VPN) tunnel.

4. The method of claim 1, further comprising monitoring, via the plurality of data monitors, for a change or loss of data within each of the datacenters.

5. The method of claim 1, wherein at least one of the datacenters is located at a geographically distinct location separate from at least a second one of the datacenters.

6. The method of claim 1, further comprising replying to the outside query based at least on a reconstructed copy of the data object.

7. The method of claim 6, further comprising:
retrieving the copy of the data object through a VPN tunnel.

8. A system comprising:
a first network;
a plurality of datacenters interconnected via the first network, each datacenter of the plurality of datacenters comprising drives, a data manager, and a plurality of data monitors, wherein each respective data monitor is associated with a respective datacenter, and wherein each data monitor monitors functionality of its respective datacenter, the first network characterized by a minimum bandwidth requirement, a maximum latency requirement, or both, selected to reduce data communication latency among the plurality of datacenters communicating on the first network; and
a data controller communicatively coupled to the first network, the data controller comprising:
an input/output for communicating via a second network;
a processor communicatively coupled to the input/output; and
memory storing instructions that cause the processor to effectuate operations comprising:
dynamically configuring, by each data manager, a redundant placement strategy for storing data within each respective datacenter of the datacenters, the redundant placement strategy defining one of a spread placement strategy and a partitioned placement strategy for selected drives of each respective datacenter of the plurality of datacenters, wherein the spread placement strategy comprises randomly choosing a subset of drives of each respective datacenter and storing each replica copy of each data object on a distinct drive of the subset of drives, with no alignment between replica copies according to the spread placement strategy, and wherein the partitioned placement strategy comprises storing data objects with replica copies aligned along boundaries of partitions of the drives of the subset of drives, with no data object having a replica copy in more than one partition;
in accordance with the redundant placement strategy for each respective datacenter, storing a data object in one of the datacenters and, in at least one of the other datacenters, storing computed code bits of the data object;
monitoring, by each data monitor functionality of its respective datacenter;
detecting, by a first data monitor of the plurality of data monitors, an event;
identifying, by the first data monitor in response to detecting the event, that data object is inaccessible as a result of the event;
communicating, by the first data monitor, with a second data monitor of the plurality of data monitors;
identifying, by the first data monitor based on the communication with the second data monitor, a location of the computed code bits of the data object;
receiving, by the first data monitor, an outside query for the data object;
redirecting, by the first data monitor in response to the outside query for the data object, the outside query to the location of the computed code bits of the data object; and
reconstructing the data object from the computed code bits.

9. The system of claim 8, wherein the first network comprises a virtual private network (VPN).

10. The system of claim 8, wherein the operations further comprise:
replying to the outside query for the data object, wherein the reply is based on a reconstructed copy of the data object.

11. The system of claim 8, wherein a number of datacenters is represented by an s and a number of the plurality of data monitors in each datacenter exceeds 1+s.

12. The system of claim 8, wherein a latency of the first network is lower than a latency of the second network.

13. A system comprising:
a processor; and
memory storing instructions that cause the processor to effectuate operations, the operations comprising:
receiving a data object for storage in a storage system, the storage system comprising a plurality of datacenters interconnected by a first network, each datacenter of the plurality of datacenters comprising drives, a data manager, and a plurality of data monitors, wherein each data monitor monitors functionality of its respective datacenter, wherein each respective data monitor is associated with a respective datacenter of the plurality of datacenters, the first network characterized by a minimum bandwidth requirement, a maximum latency requirement, or both, selected to reduce data communication latency among the plurality of datacenters communicating on the first network;
dynamically configuring, by each data manager, a redundant placement strategy for storing data within each respective datacenter of the datacenters, the redundant placement strategy defining one of a spread placement strategy and a partitioned placement strategy for drives of each respective datacenter, wherein the spread placement strategy comprises randomly choosing a subset of drives of each respective datacenter and storing each replica copy of each data object on a distinct drive of the subset of drives, with no alignment between replica copies according to the spread placement strategy, and wherein the partitioned placement strategy comprises storing data objects with replica copies aligned along boundaries of partitions of the drives of the subset of drives, with no data object having a replica copy in more than one partition;
storing a data object in one of the datacenters and, in at least one of the other datacenters, storing computed code bits of the data object;
monitoring, by each data monitor functionality of its respective datacenter;
detecting, by a first data monitor of the plurality of data monitors, an event;
identifying, by the first data monitor in response to detecting the event, that the data object is inaccessible as a result of the event;
communicating, by the first data monitor, with a second data monitor of the plurality of data monitors;
identifying, by the first data monitor based on the communication with the second data monitor, a location of the computed code bits of the data object;
receiving, by the first data monitor, an outside query for the data object; and
redirecting, by the first data monitor in response to the outside query for the data object, the outside query to the location of the computed code bits of the data object; and
reconstructing the data object from the computed code bits.

14. The system of claim 13, wherein the operations further comprise:
determining, by the monitor, that the outside query for the data object was received via a second network;
receiving, by the monitor, a transmission based on a reconstructed copy of the data object; and
transmitting a reply to the outside query based at least on the transmission.

15. The system of claim 14, wherein a latency of the first network is lower than a latency of the second network.

16. The system of claim 14, wherein the first network comprises a virtual private network (VPN).

17. The system of claim 13, wherein at least one of the data monitors is a Ceph instance.

18. The system of claim 13, wherein a number of datacenters is represented by s and a number of the data monitors is equal to at least s+1.

19. The method of claim 1, wherein a reliability of the datacenter group is controlled by a parameter s representing a number of extra replicas of each stored data object and wherein a number of data centers of the plurality of datacenters is equal to s, and a number of data monitors in each respective datacenters is represented by s+1.

20. The method of claim 19, further comprising selecting s to be equal to 1 to improve the reliability of the datacenter group.

* * * * *